Feb. 17, 1959  M. O'HIGGINS  2,873,783
ANTI-SKID DEVICE FOR TIRES
Filed Dec. 6, 1954

INVENTOR.
MICHAEL O'HIGGINS
BY
J.B. Dickman, Jr.
ATTORNEY

United States Patent Office 2,873,783
Patented Feb. 17, 1959

2,873,783

ANTI-SKID DEVICE FOR TIRES

Michael O'Higgins, Washington, D. C.

Application December 6, 1954, Serial No. 473,273

1 Claim. (Cl. 152—218)

This invention relates to anti-skid devices for attachment to the tire or tires on the wheels of a vehicle, particularly its traction wheels.

The object of this invention is to make a sturdy and simple anti-skid attachment for tires which may be used on any size of tires within the range of common usage, and which may be easily mounted on any tire independently of any attaching means to the wheel itself.

Another object is to provide an anti-skid attachment for tires, having a plurality of radially adjustable traction hooks to be pulled in radially over the tire, and having a central mechanism that will fit against the side of the wheel for simultaneously drawing all the traction hooks radially inward to any degree for tightening the attachment on the tire.

A further object is to make this mechanism operable by a single adjustment to provide positive movement simultaneously of all the hooks inwardly thereof to fix the hooks firmly on the tire.

A further object is to provide for resilient further movement of each individual hook inwardly as the wheel rides over that hook when the vehicle is in motion.

Figure 1:
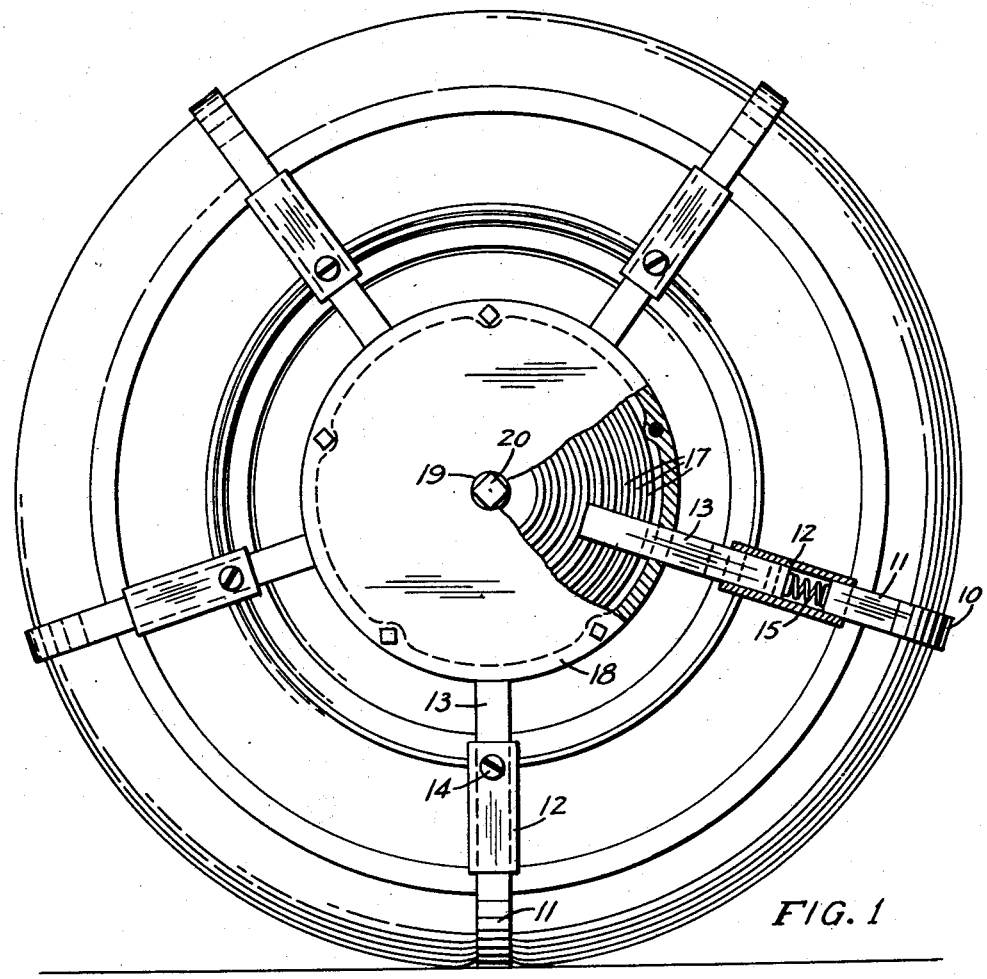
Figure 2:
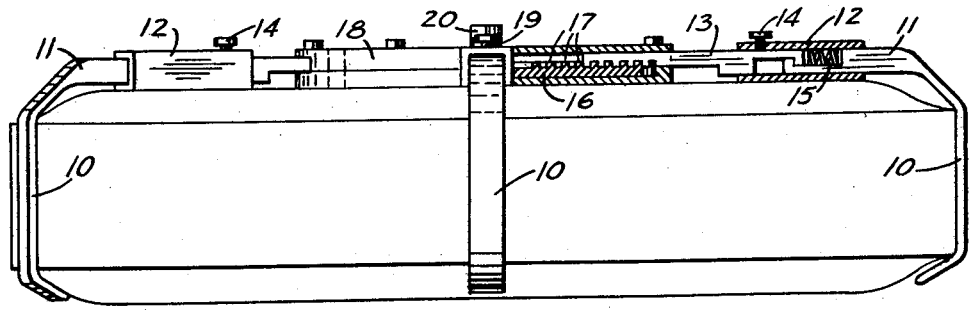

Other and more specific objects will become apparent in the following detailed description of a preferred form of the invention and in the accompanying drawings, wherein Fig. 1 shows a side view of the anti-skid attachment mounted on a wheel, with parts thereof in section, and Fig. 2 shows the bottom view of the same, with parts in section.

The present invention is illustrated in its preferred form as having five traction hooks 10. Each hook has a shaft portion 11 constrained to slide within a sleeve 12 in hooked connection with the end of rack member 13 to which the sleeve 12 is fixed as by a set screw 14. The hook connection limits the radially outward movement of the hook 10 in the sleeve 12 but permits inward movement thereof which is restrained only by a resilient means such as coil spring 15 mounted in the sleeve 12 between the end of rack member 13 and a shoulder on the shaft portion 11 (see Fig. 2).

A flat circular plate 16 having continuous spiral threads 17 on one face, is rotatably mounted in a central casing 18 having five peripheral openings in which the rack members 13 are slidably mounted with their rack portions engaged with the spiral threads 17. Casing 18 has a central opening in which a shaft 19 extends from the plate 16 and has a square or other flatsided end 20, to which a wrench or other operating handle or tool may be applied to turn the spiral threaded plate in the casing in either direction. As the spiral threads are turned the rack members are moved in or out of the casing simultaneously, depending on which way the plate is turned, and either tighten the traction hooked on the tire, or loosen them to remove the attachment from the tire.

It is thus seen that this attachment while being of a simple construction, may be easily attached to or removed from a tire as the occasion demands without lifting the axle or moving the vehicle. Yet it may be made more sturdy and durable and will give better satisfaction in service than many of the present non-skid devices. It may be further seen that in tightening the attachment on the tire, the traction hooks are positively held against the periphery of the tire. Even when the tire passes over the hook that comes to the bottom of the wheel in its rotation, if the tire gives any and is depressed by the weight on the wheel, the spring 15 permits the hook to move into the depression and maintain positive and firm anti-skid contact with the tire because of this depression. At the same time the weight on the wheel is never transmitted to the rest of the attachment from this hook, because of the resilient connection therebetween.

Obviously, as few as three traction hooks could be used in an attachment, or as many as might be deemed suitable, without departing from the spirit and scope of this invention, as defined in the appended claim.

What is claimed is:

A removable non-skid attachment for an automobile wheel comprising a plurality of traction hooks having extension shafts with racks on their end portions, said racks comprising arcuate transverse lands and grooves, a central frame applicable to the outer face of the hub of the wheel and having a rotatable plate with spiral threads on one face mounted therein, and having radial openings equally spaced around its periphery for slidably receiving said end portions with the lands and grooves of said racks engaging said threads, said plate having means for engagement by a hand wrench to turn said plate in said frame and thereby simultaneously move all the rack end portions radially in or out to tighten said traction hooks over a tire or loosen them and remove the attachment from the wheel respectively, depending on the direction of turning, a plurality of said lands and grooves being always in engagement with said spiral threads, each of said extension shafts including a radially extending sleeve fixed to said end portion outside of said frame, and a shaft portion integral with said traction hook slidably fitting in the outer end of said sleeve and overlapping the outer end of said end portion, said end and said shaft portion being hooked over each other to provide a limit to the outward movement of said shaft portion relative to the sleeve, and resilient means urging said shaft portions toward said limit, said resilient means being a compression spring mounted in said sleeve between the outer end of said end portion and a shoulder on said shaft portion.

References Cited in the file of this patent

UNITED STATES PATENTS

| | | |
|---|---|---|
| 1,540,470 | Hayden | June 2, 1925 |
| 2,007,853 | Fuss | July 9, 1935 |
| 2,456,438 | Miller | Dec. 14, 1948 |
| 2,754,874 | Gardner | July 17, 1956 |